United States Patent
Horwath et al.

(10) Patent No.: US 10,422,327 B2
(45) Date of Patent: Sep. 24, 2019

(54) DEVICE AND METHOD FOR DAMPING PRESSURE FLUCTUATIONS IN THE DELIVERY LINE OF A THICK-MATTER PUMP

(71) Applicant: Putzmeister Solid Pumps GmbH, Aichtal (DE)

(72) Inventors: Winfried Horwath, Neuhausen (DE); Uli Freitag, Stuttgart (DE); Dirk Hövemeyer, Dettingen/Erms (DE)

(73) Assignee: PUTZMEISTER SOLID PUMPS GMBH, Aichtal (DE)

( * ) Notice: Subject to any disclaimer, the term of this patent is extended or adjusted under 35 U.S.C. 154(b) by 0 days.

(21) Appl. No.: 15/386,248

(22) Filed: Dec. 21, 2016

(65) Prior Publication Data
US 2017/0101986 A1    Apr. 13, 2017

Related U.S. Application Data

(63) Continuation of application No. PCT/EP2015/063807, filed on Jun. 19, 2015.

(30) Foreign Application Priority Data

Jun. 23, 2014  (DE) .................. 10 2014 212 021

(51) Int. Cl.
*F04B 11/00*    (2006.01)
*F04B 15/02*    (2006.01)
(Continued)

(52) U.S. Cl.
CPC ...... *F04B 11/0008* (2013.01); *F04B 11/0025* (2013.01); *F04B 15/02* (2013.01);
(Continued)

(58) Field of Classification Search
CPC ...... F04B 11/0008; F04B 11/00; F04B 23/02; F04B 15/02; F04B 49/065; F04B 53/10; F04B 11/0025; F04B 49/06; F16L 55/053
(Continued)

(56) References Cited

U.S. PATENT DOCUMENTS 2,290,788 A * 7/1942 Wilson ................ F04B 11/0025
                                                    138/26
4,278,403 A * 7/1981 Shafer ...................... F15B 1/033
                                                    417/38
(Continued)

FOREIGN PATENT DOCUMENTS

AT          394 034 B      1/1992
DE          20 52 583 A1   5/1972
(Continued)

OTHER PUBLICATIONS

English translation of International Preliminary Report on Patentability and Written Opinion of the International Searching Authority, PCT/EP2015/063807, dated Dec. 27, 2016.

*Primary Examiner* — Charles G Freay
(74) *Attorney, Agent, or Firm* — Bose McKinney & Evans LLP

(57) ABSTRACT

A device for damping pressure fluctuations in a delivery line of a thick-matter piston pump. The device includes a container communicating with the delivery line and at least partially filled with a compressible fluid. The container is adapted for a pulsing intake and output of transported material during the pumping operation. A controller adjusts the amount of the compressible fluid in the container as a function of operating parameters. The controller includes a pressure sensor for determining delivery pressure and an electronic computing unit. The computing unit determines and stores a pressure ratio V between delivery pressure values occurring during a working cycle of the thick-matter (Continued)

pump and during a switch-over phase between each working cycle of the pistons of the thick-matter pump. Alternately or additionally, the electronic computing unit may determine and store a mean value M of the delivery pressure over a time interval during the switch-over phase.

20 Claims, 6 Drawing Sheets

(51) Int. Cl.
  *F04B 49/06* (2006.01)
  *F16L 55/053* (2006.01)
  *F04B 23/02* (2006.01)
  *F04B 53/10* (2006.01)
(52) U.S. Cl.
  CPC .............. *F04B 23/02* (2013.01); *F04B 49/06* (2013.01); *F04B 49/065* (2013.01); *F16L 55/053* (2013.01); *F04B 53/10* (2013.01)
(58) Field of Classification Search
  USPC ........................................................ 417/543
  See application file for complete search history.

(56) References Cited

U.S. PATENT DOCUMENTS

| | | | |
|---|---|---|---|
| 5,064,360 A | 11/1991 | Blum | |
| 6,116,872 A * | 9/2000 | Takeshita | F04B 11/0091 137/565.34 |
| 6,837,693 B2 * | 1/2005 | Welch | F04B 11/0016 417/540 |
| 2003/0221722 A1 | 12/2003 | Hogsden et al. | |
| 2006/0193738 A1 * | 8/2006 | Schwing | F04B 11/0008 417/523 |
| 2011/0110793 A1 * | 5/2011 | Leugemors | F04B 43/02 417/53 |
| 2013/0098456 A1 * | 4/2013 | Charlton | F04B 11/00 137/1 |

FOREIGN PATENT DOCUMENTS

| | | |
|---|---|---|
| DE | 39 10 189 A1 | 10/1990 |
| EP | 0 389 785 A2 | 10/1990 |
| GB | 2 371 088 A | 7/2002 |
| GB | 2 392 762 A | 3/2004 |
| JP | S56-28399 A | 3/1981 |

* cited by examiner

DEVICE AND METHOD FOR DAMPING PRESSURE FLUCTUATIONS IN THE DELIVERY LINE OF A THICK-MATTER PUMP

RELATED APPLICATIONS

This application is a continuation of PCT/EP2015/063807, filed Jun. 19, 2015, which claims priority to DE 10 2014 212 021.7, filed Jun. 23, 2014, both of which are hereby incorporated herein by reference in their entireties.

BACKGROUND

The invention relates to a device and a method for damping pressure fluctuations in a delivery line of a thick-matter piston pump, comprising at least one container which communicates with the delivery line and is at least partially filled with a compressible fluid, for the pulsing intake and delivery of transported material during the pumping operation of the thick-matter pump with alternating compression and expansion of the fluid.

Thick-matter or concrete piston pumps, mainly in the form of two-piston pumps, exhibit a function-related delivery gap during the switch-over from the intake stroke to the pressure stroke, and vice versa. For a short period of time lasting roughly 0.2 to 1 second, depending on the size of the machine, there is no material flow and the pressure in the delivery line briefly plummets. This brief interruption in the delivery flow with a corresponding drop in pressure causes knocking and high mechanical loads in the delivery line. This may result in material fatigue and premature failure. For this reason, there are different approaches to minimizing pressure drops of this kind by means of damping measures. Diaphragm dampers or hose dampers are used, for example, although they only work optimally over a small pressure range and are subject to a high degree of wear due to the moving rubber diaphragm, particularly when abrasive material is being transported. There is therefore a need for a damping system which has a simple construction, can be economically realized and works reliably when operated with the transported material used, for example thick-matters such as concrete, tailings, fly ash, slurry and the like, and is low-wear.

A known damping device is the so-called air vessel, in which a container, usually in the form of a vessel or pipe, installed on the suction and/or pressure side of the pump and preloaded with gas, delivers its stored energy during the delivery gap and thereby helps to reduce said delivery gap. This is a standard system in piston-diaphragm or plunger pumps, with which low-pulsation operation can be achieved. Although the air vessel combined with two-piston thick-matter pumps does not guarantee a completely continuous delivery flow, it dampens the pressure drops and, as a consequence, the pipeline knocking to an acceptable degree.

SUMMARY

This disclosure teaches a cost-effective and reliable device and method of the aforementioned kind.

This disclosure is primarily based on the idea that the filling level, in other words the volume or amount, of the fluid in the container must have a given minimum value, in order to ensure an adequate damping effect. If, over the course of time, part of the fluid escapes from the container, for example due to its mixing into the transported material and outward transportation therewith, the loss must be offset by refilling. If, however, there is too much refilling, the surplus escapes unnecessarily into the delivery line. It should be borne in mind in this connection that the supply of pressurized fluid represents a not-unsubstantial share of the operating costs of the overall delivery plant. A direct determination of the filling level in the container by means of an oscillating fork sensor, for example, has not proved feasible in practice, as the sensor is exposed to a high degree of wear due to the action of the transported material. Other types of filling level sensors have also failed to satisfy the demands made of them.

This disclosure is therefore based on a filling level control based on the reliably measurable delivery pressure in the delivery line. This disclosure therefore provides a control device (i.e., controller) for the fluid filling level in the container as a function of operating parameters during pump operation, said control device comprising at least one pressure sensor for determining the delivery pressure which is arranged in the container or the delivery line and also an electronic computing unit which is intended and suitable for determining and storing a pressure ratio V between delivery pressure values during a working cycle of the thick-matter pump, on the one hand, and a switch-over phase between each of the two working cycles of the two pistons of the thick-matter pump, on the other hand, or a mean value M of the delivery pressure over a time interval during the switch-over phase as a measure of the effectiveness of the damping. The pressure sensor need not necessarily be disposed in the container or in the delivery line; instead, the pressure of the drive or delivery fluid can be measured at any point in the delivery system. By controlling the fluid filling level (i.e., the amount of compressible fluid in the container), it is possible for the damping to be within an optimum operating range and, at the same time, the demand for supplied or refilled fluid is lowered, as a result of which the energy consumption of the device is reduced.

In order to offset the fluid losses occurring over time, a filling device for filling the at least one container with fluid in accordance with the control device is advantageously provided. This means that manually controlled refilling is unnecessary. The filling device may preferably be configured as a motorized air compressor or also as at least one pressure cylinder filled with fluid.

In order to prevent a pushing back of transported material in the direction of the pump during the switch-over phase of the thick-matter pump, a non-return valve which closes in the direction of the thick-matter pump is advantageously provided between the thick-matter pump and the at least one container.

For automated continuous operation of the delivery pressure damping system in the switch-over phase, it is advantageous for lower and upper threshold values to be stored in the control device for starting and, on reaching the pre-set pressure condition, switching off the filling device.

The at least one container is advantageously configured as a pressure container, for example as a tank or pipe. Furthermore, if necessary more than one container can be connected in a parallel configuration to the delivery line, for example in the case of large pumps and delivery capacities.

The method according to this disclosure for damping pressure fluctuations in a delivery line of a two-piston thick-matter pump is characterized in that by means of a control device, a fluid filling level in the container depending on operating parameters during the pumping operation can be maintained between pre-set minimum and maximum values. In this case, the delivery pressure is advantageously continuously determined as a measure of the damping of pressure drops achieved in the switch-over phase of the thick-matter pump using at least one pressure sensor disposed in the container or the delivery line and using an electronic computing unit of the control device, a pressure ratio V between delivery pressure values during the working cycle of the thick-matter pump, on the one hand, and the switch-over phase between each of the working cycles of the two pistons of the thick-matter pump, on the other hand, or a mean value M of the delivery pressure over a time interval during the switch-over phase as a measure of the effectiveness of the damping is determined and stored. A discrete value in the region of the maximum delivery pressure value, i.e., a value measured towards the end of the delivery stroke, is preferably used as the delivery pressure value of the working cycle, for example a delivery pressure value measured after 70% of the stroke.

The container is preferably automatically subjected to the fluid in response to the control device by means of a filling device. It is advantageous in this case for the filling device to switch on when a pre-set lower threshold value of the fluid filling level in the container is reached and switch off when a pre-set upper threshold value of the fluid filling level is reached. For reasons of cost, air is preferably used as the fluid, although other types of gas can also be used.

In a further embodiment of this disclosure, the non-return valve is configured as a forced-control valve between the pump and the delivery line, which valve is closed in accordance with sensors arranged on the hydraulic cylinders of the pump via the control device and passively opened by the delivery pressure in the pump cycle. The precise point in time at which the valve is closed is particularly significant in this case, in order to prevent transported material from flowing back towards the pump. The valve is therefore force-closed at the end of the pump cycle in a sensor-controlled manner and passively opened following the switch-over to the other delivery cylinder by the delivery pressure then created. In order to allow the opening of the valve, a corresponding sensor or switch is arranged on each of the delivery cylinders which, when the stroke of the cylinder is actuated or determined via the control device, cancels the blocking of the valve. It is also possible in this case for the actuation times of the valve to be variably configured depending on operating parameters, with the overriding aim of optimizing the damping in the delivery line and therefore minimizing pressure fluctuations in the delivery line.

Furthermore, it is possible for the filling device, preferably a compressor or compressed air cylinders, and the control device to be used for more than only one pump unit and delivery line. The control device is then configured in such a manner that the plurality of parallel pump units and delivery lines can be actuated independently of one another. Since the filling device is not constantly active, it is also possible for a plurality of parallel pump units and delivery lines to be supplied even without a larger-sized filling device, so that the efficiency of the damping device is increased. It is also possible for a pressure vessel to be provided between a compressor of the filling device and the at least one damper as a buffer device. This is particularly advantageous for the start of operations, the start-up process, since a large amount of working fluid has to be supplied at that point, in order to achieve the desired damping characteristics as quickly as possible. Without the pressure vessel as a buffer device, a larger compressor would then have to be supplied than would be necessary for the continuous operation of the plant.

Furthermore, tests have shown that it is advantageous for the cross-sections of the delivery line and of the at least one damper, i.e., the tubular container, not to deviate greatly from one another, wherein the container cross section in particular should be no smaller than the delivery line cross section. If this is not the case, disruptive flow turbulence can occur in the transported material. This can lead to air pockets in the transported material which remove the working fluid from the damper, so that the damping effect quickly abates and working fluid has to be refilled via the filling device more frequently than desired, leading to an increase in operating costs.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

It shall be understood that various terms used throughout this disclosure and claims should not receive a singular interpretation unless it is made explicit herein. By way of non-limiting example, the terms "container," "delivery line," and "thick matter pump," to name just a few, should be interpreted when appearing in this disclosure and claims to mean "one or more" or "at least one." All other terms used herein should be similarly interpreted unless it is made explicit that a singular interpretation is intended.

Figure 1:
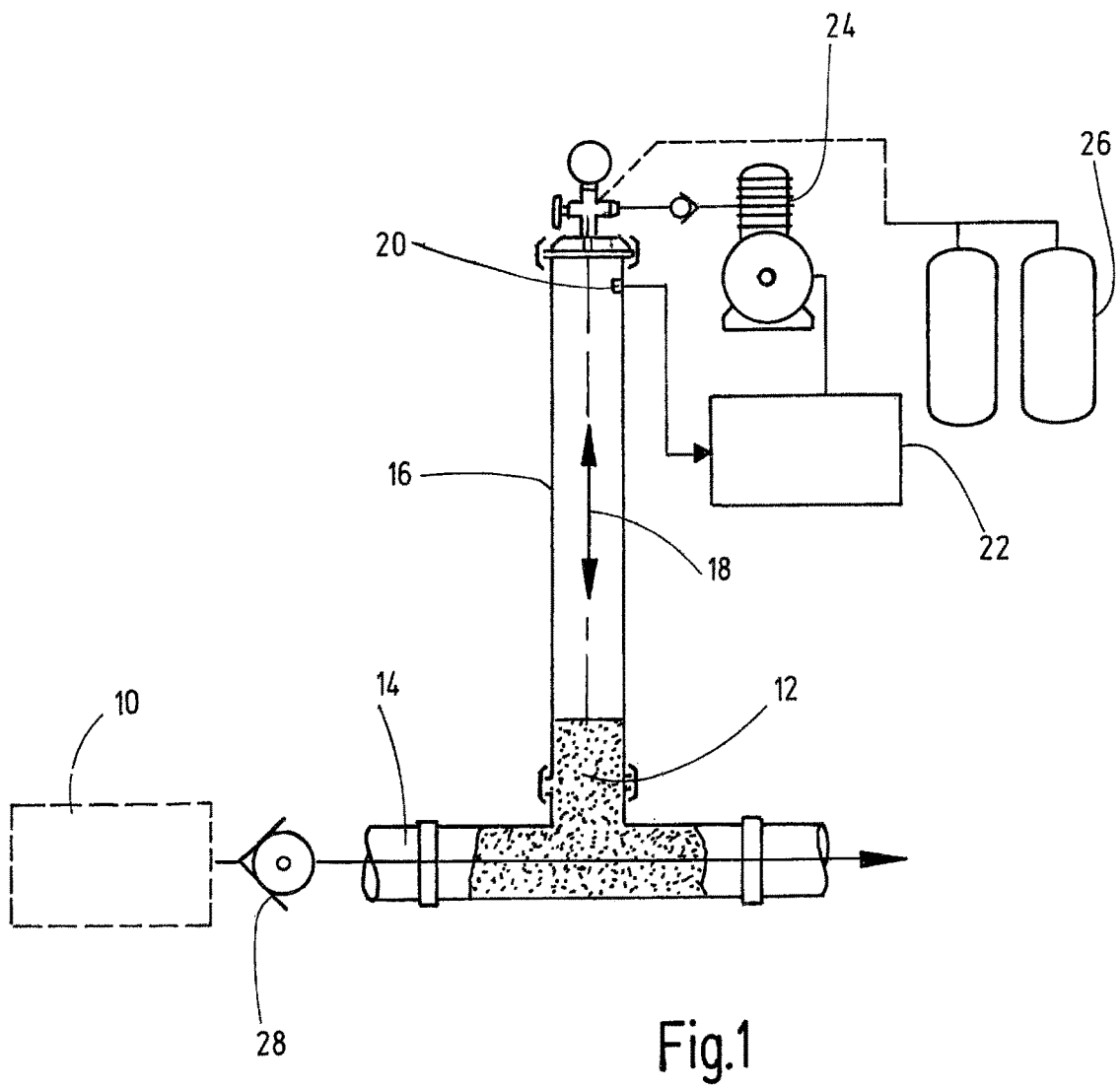
FIG. 1 shows a schematic diagram of a device for damping pressure fluctuations in the delivery line of a two-piston thick-matter pump.

FIG. 1 represents the operating principle of the damping device. A two-piston thick-matter pump 10 pumps transported material 12 through a delivery line 14 in an alternating piston cycle. A tubular container 16 is connected to the delivery line 14 as the damper. The container 16 is filled with compressed air as the fluid to a level that allows a certain amount of transported material 12 to flow into the container. During the switch-over between the two pump pistons, a short delivery gap periodically occurs which leads to a brief drop in delivery pressure and therefore a pulsating movement of the transported material 12 in the container in the direction of the double arrow 18. The fluid filling level or, respectively, the level of the transported material 12 in the container 16 is metered such that the compressed air cannot escape unobstructed via the delivery line 14 during the delivery gap. However, a certain loss of compressed air over time is inevitable, which means that compressed air has to be repeatedly refilled during operation, so that the desired degree of damping can be maintained. A pressure sensor 20 (and 20' in FIG. 6) for the continuous measurement of the delivery pressure is arranged on the container 16. If the measured delivery pressure drops sharply during the delivery gap, this is a sign that damping has abated and that compressed air should be refilled. A control device (controller) 22 is provided for this purpose which is subjected to the signal from the pressure sensor 20 and, as explained in greater detail below, which activates a compressor 24 to refill the container 16 with compressed air. Instead of a compressor, compressed air cylinders 26 may be connected to the container via a control valve, wherein the control device 22 then triggers the control valve for refilling the compressed air. The device furthermore comprises a shut-off device configured as a non-return valve 28 which closes in the direction of the pump 10, so that no transported material can flow from the damper 16 in the direction of the pump 10.

The pressure profile in the delivery line 14 (transported material 12) or in the damper 16 (gas side) is used to control the damper 16. Because the pressure in the transported material 12 is the same as in the compressed air volume, they can both be alternatively used. The advantage of the pressure measurement on the compressed air side is that the pressure sensor 20 is not in the transported material 12 and is therefore not subject to abrasive wear.

Figure 2:
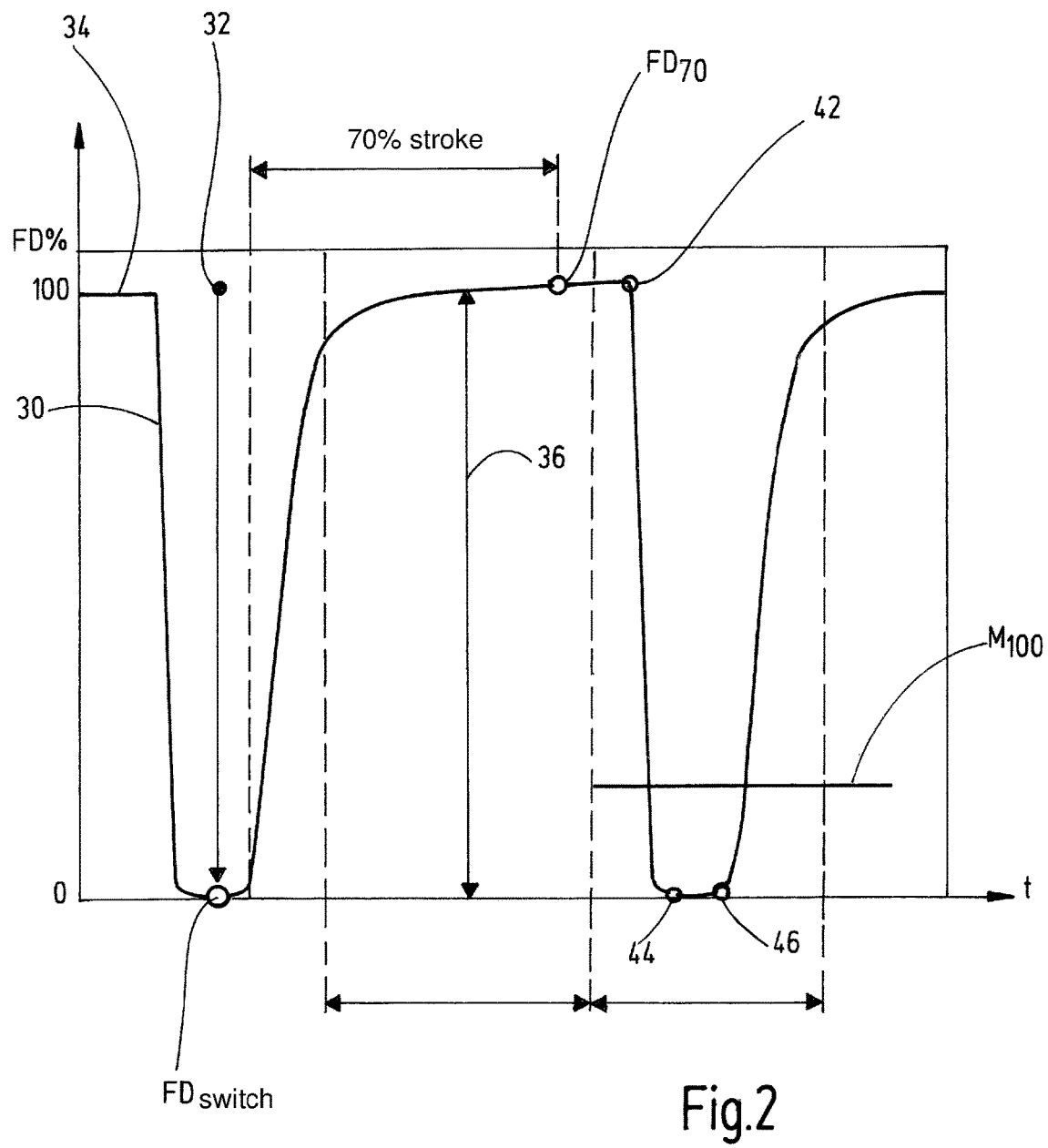
FIG. 2 shows a graph of the delivery pressure as a function of time in the absence of fluid filling.

FIG. 2 shows the pressure profile 30 during a pressure drop 32 of 100%, i.e., there is no damping effect due to the absence of any compressed air filling. During the pump stroke, the maximum value 34 of the delivery pressure (100%) is reached. During the switch-over between the two pump pistons, a delivery gap occurs, during which the delivery pressure completely collapses (0%) due to the absence of a compressed air buffer. The difference between the maximum pressure and the minimum pressure, the pressure drop, is therefore 100%.

The degree of the pressure drop can be determined automatically, in that for the duration of the switch-over (approx. 2 seconds) the mean value M of the pressure in the transported material 12 or in the fluid, in the following collectively referred to as pressure in the medium, is formed.

The greater the pressure drop, the smaller the mean value M. The smaller the pressure drop, the greater the mean value M. As an alternative to the formation of the mean value, a delivery pressure at the time of the switch-over phase can also be used. This delivery pressure can be compared with a delivery pressure 36 after x% of the stroke (e.g., 70% in FIG. 2). The ratio V of these two pressure values is a measure of the damping during the switch-over phase:

$$V_{100} = FD_{switch}/FD_{70}$$

wherein $FD_{switch}$ is the delivery pressure in the switch-over phase and $FD_{70}$ is the delivery pressure after 70% of the stroke.

The delivery pressure FD to be evaluated within the switch-over phase may be the minimum pressure, but this need not necessarily be the case. In theory, it may be any (low) pressure during the switch-over phase at a reproducible point in time.

In order to assist understanding, in the following graphs of FIGS. 3 and 4 the minimum delivery pressure FD during the switch-over phase was always used. The mean value M or the pressure ratio V is a measure of the effectiveness of the damper. Moreover, the compressed air filling of the damper 16 can be controlled. If the determined mean value M falls below a pre-set lower threshold value, the compressor 24 is switched on and the damper 16 is filled with compressed air. When the determined mean value M reaches a pre-set upper threshold value, the compressor 24 is switched off and the compressed air filling stops. This applies similarly to control via the pressure ratio V. When the compressed air filling over time and therefore the damping effect are reduced again, the filling is reactivated at the lower pre-set threshold value.

This approach also works with changing maximum pressures $FD_{max}$ and has an advantage in this respect over statically preloaded diaphragm or bubble dampers which are only optimally designed for one operating point. The approach described here automatically adapts to varying operating parameters. For this purpose, it is advantageous for the mean value M of the delivery pressure during the switch-over phase to be coupled to the mean value of the actual pressure stroke $FD_{meanstroke}$. This means that information can be derived as to the effect of the damper 16, even during changing delivery pressures, and the fluid filling level of the damper can be controlled accordingly.

Figure 3:
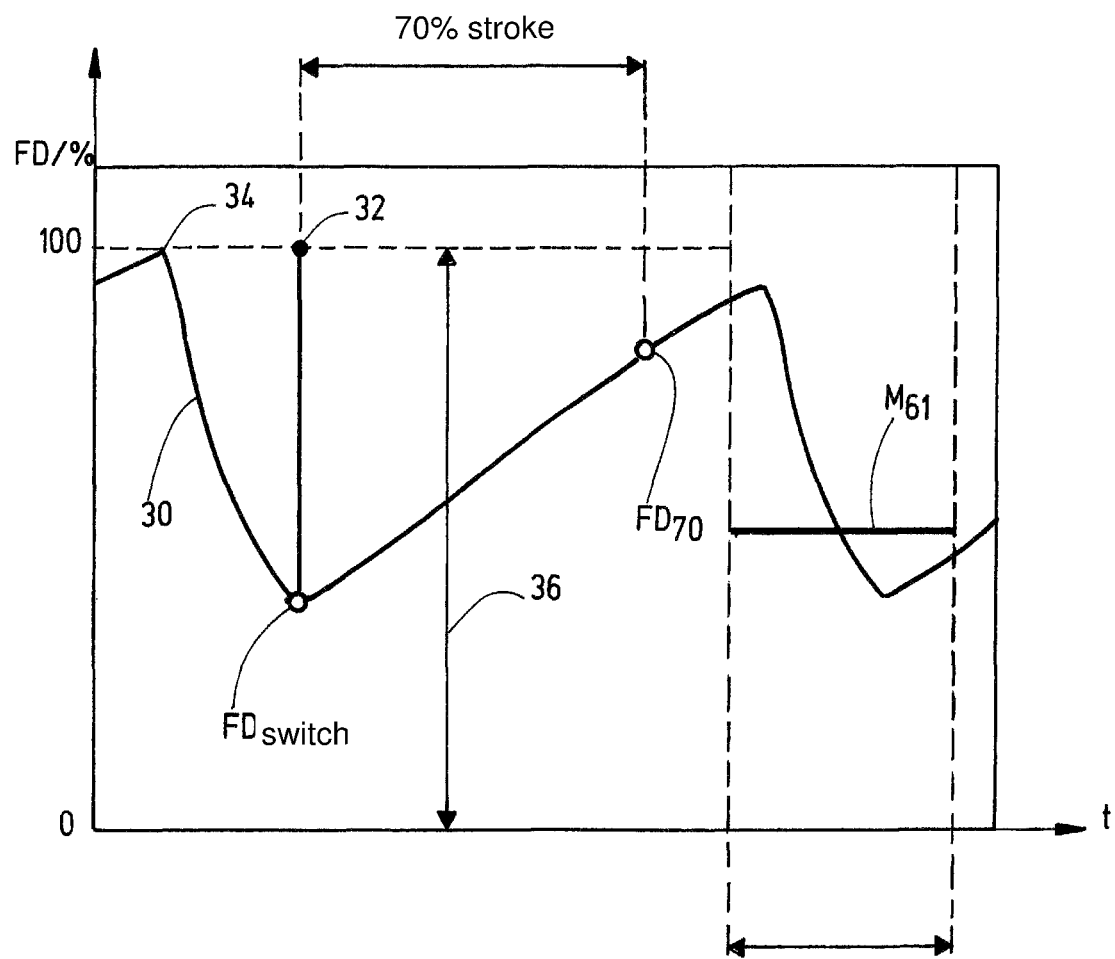
FIG. 3 shows a graph of the delivery pressure as a function of time with partial fluid filling.

The graph of FIG. 3 shows the delivery pressure profile during a 61% pressure drop in the switch-over phase. The mean value $M_{61}$ determined in this case is greater than the mean value $M_{100}$ in FIG. 2. In the same way, the pressure ratio $V_{61} = FD_{switch}/FD_{70}$ is greater in this case than the pressure ratio $V_{100}$ in FIG. 2. The value $M_{61}$ or $V_{61}$ may, for example, be used as the lower threshold value for the switching-on of the compressor 24 to fill the damper 16.

Figure 4:
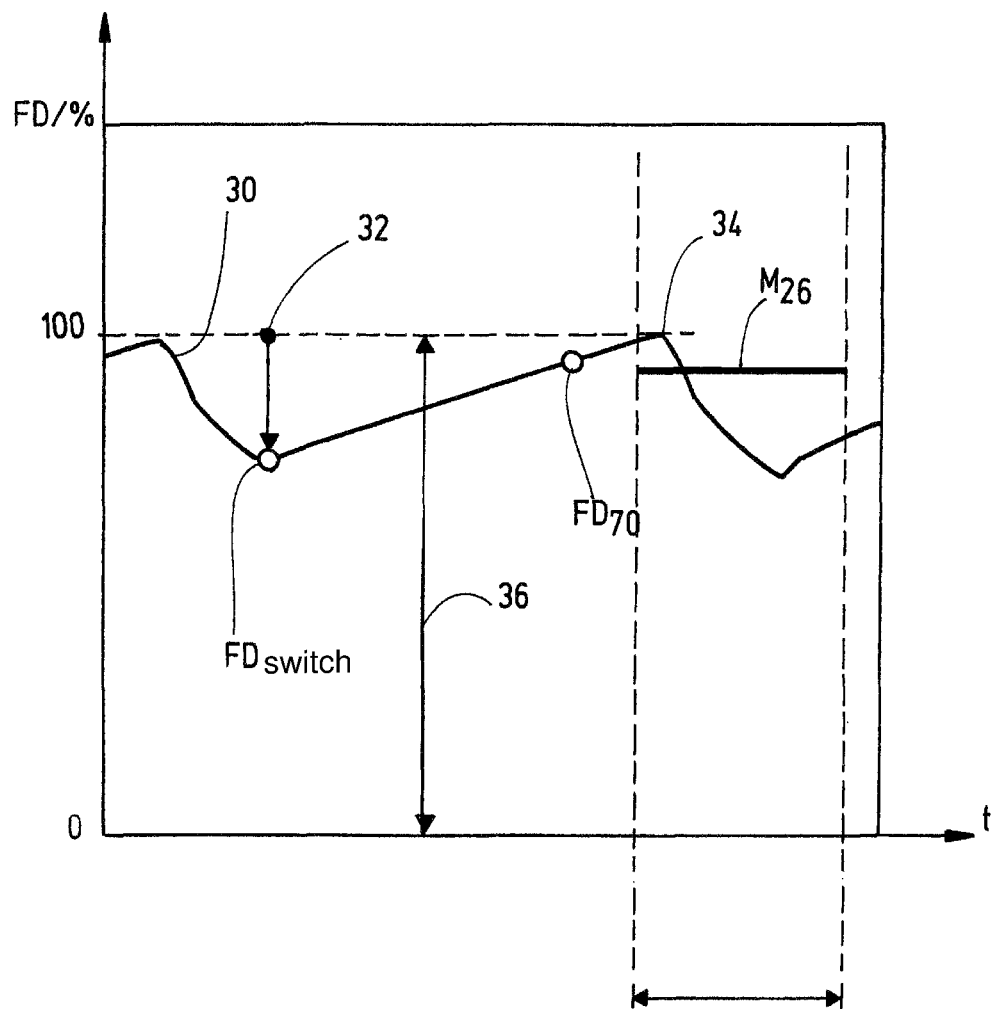
FIG. 4 shows a graph of the delivery pressure as a function of time with increased fluid filling compared with FIG. 3.

The graph of FIG. 4 shows a corresponding delivery pressure profile with a 26% pressure drop in the switch-over phase. The mean value $M_{26}$ is greater than the mean value $M_{61}$ in FIG. 3. Equally, in this case the ratio $V_{26}$ is greater than the ratio $V_{61}$ in FIG. 3. The value $M_{26}$ or $V_{26}$ may be used as the upper threshold value for the switching-off of the compressor 24.

The smallest achievable pressure drop in the switch-over phase is dependent on the system, the transported material and the machine. It will occur with the maximum compressed air filling and a correctly operating damper 16. The maximum mean value $M_{max}$ results from this operating state.

It is advantageous to prescribe as the upper threshold value a mean value $M_{SO}$ slightly lower than $M_{max}$ (for example by 5%-10%), so that when the upper threshold value is reached, the compressed air filling is reliably switched off.

Furthermore, it is advantageous for the upper and lower switching threshold to be continually adjusted depending on the maximum pressure $FD_{max}$, so that an optimum damper effect is always achieved. For this purpose, it is advantageous to determine the mean value of the pressure profile in the stroke $FD_{meanstroke}$ and to accordingly adjust the switching thresholds.

In order to indicate a stable mean value (e.g., on a control system display) it is also advantageous for a mean value to be periodically formed from a plurality of mean values (e.g., a mean value is formed again from 20 mean values). This suppresses both high and low spikes and prevents the switching thresholds from responding prematurely.

Figure 5:
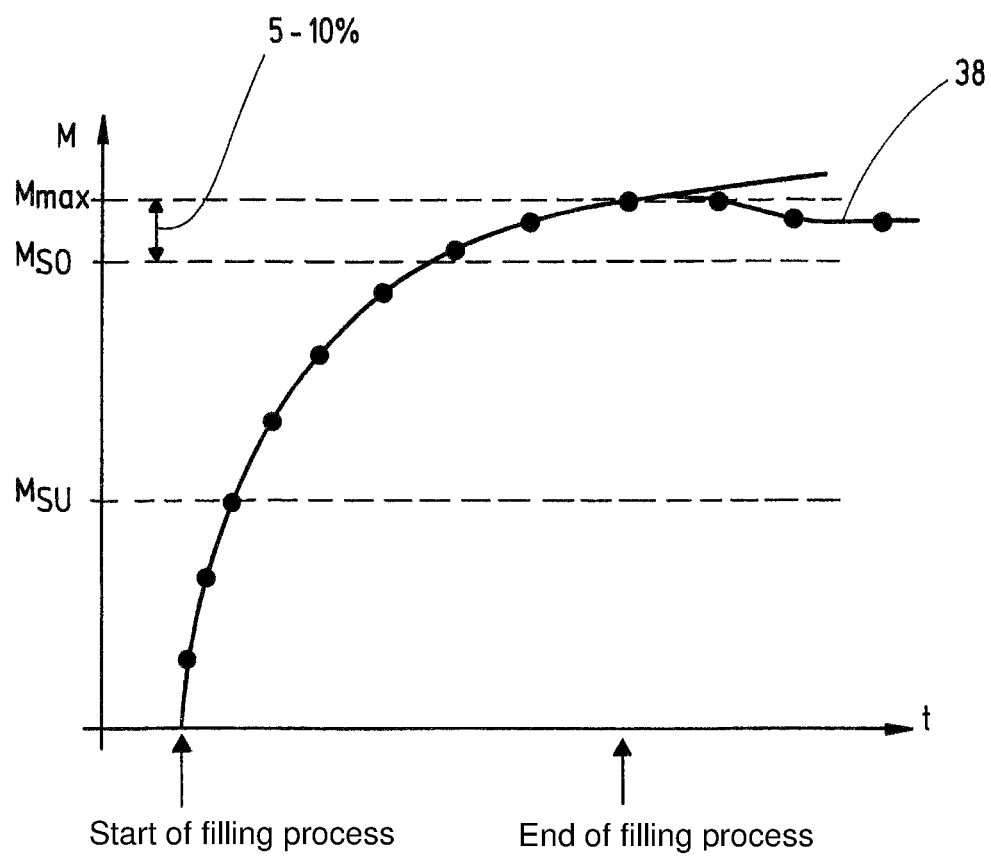
FIG. 5 shows a graph of the mean value M of the delivery pressure in the switch-over phase of the pump with the fluid filling level increasing as a function of time.

The determination of the upper and lower threshold values for switching the compressor 24 on and off is explained with the help of the graph of FIG. 5.

The lower threshold values are preferably determined during the starting of the pump device and this depends on the performance of the delivery line 14 with respect to vibrations and noises. This can be determined by the damper 16 being gradually filled with compressed air, during which the plant and delivery line performance is observed. This may, for example, also be effected by a display of the pressure profile during the switch-over phase on the control device 22. The representation of the pressure profile should take place with a high scanning rate (at least 100 Hz), in order to be able to display and evaluate the pressure drop with precise timing. If the point is found at which a satisfactory plant function prevails, this mean value M can be stored in the control system as the lower threshold value $M_{SU}$.

The determination of the maximum mean value $M_{max}$ likewise takes place during starting, in that the point from which on there is no longer any change or improvement in the damper performance is observed. This value is then likewise stored in the control device. Based on this value, the upper threshold value $M_{SO}$ can then be set as previously described.

The mean values are represented against time in a graph on the control device. This time curve clearly shows when the upper threshold value has been reached. This is the time from which the gradient of the curve becomes increasingly flat, i.e., the effect of the damper 16 does not increase further. At this point in time, the starting and filling process can be suspended. Before the system stabilizes, a small amount of compressed air will possibly still escape into the pipeline (this can be seen from the diminishing mean value), which, however, does not affect the damper function substantially. The upper threshold value $M_{SO}$ should, however, be below the mean value of the stabilization phase 38 in each case.

Figure 6:
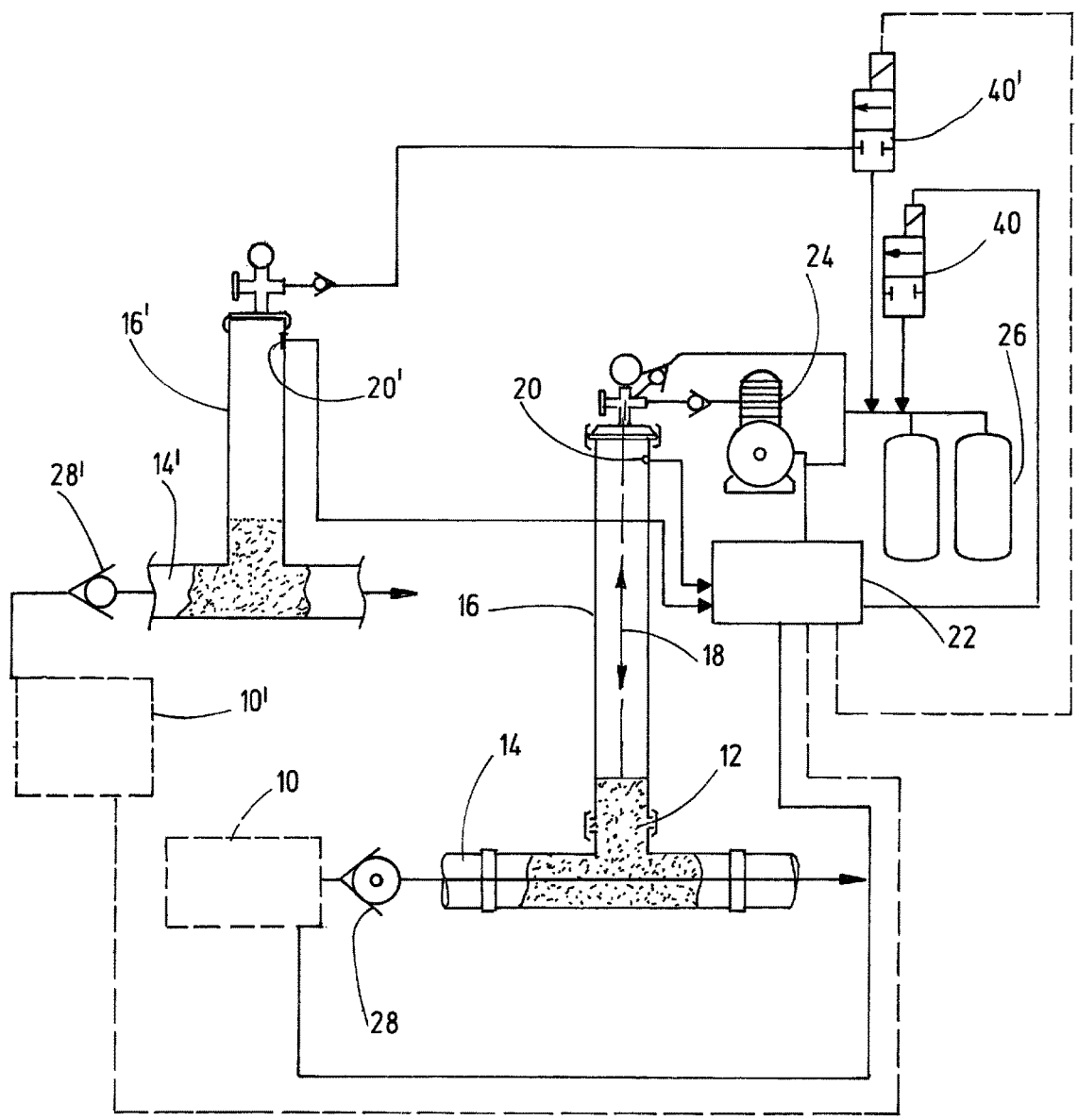
FIG. 6 shows a schematic representation corresponding to FIG. 1 with a plurality of thick-matter pumps and delivery lines each with associated damping devices operated in parallel.

FIG. 6 shows a schematic representation corresponding to FIG. 1, wherein, however, two thick-matter pumps 10, 10' arranged in parallel and damped delivery lines 14, 14' are provided, wherein this representation is only exemplary and three or more thick-matter pumps and delivery lines could easily be present. In this embodiment, the different pump lines, in other words thick-matter pumps 10, 10' and associated delivery lines 14, 14', are controlled in parallel by a single control device 22 and subjected to fluid from a single filling device 24, 26. The individual pump lines are self-sufficient and may, for example, differ from one another with regard to their pump cycles and delivery volume, i.e., the sizes of the pumps and the delivery lines. The shut-off devices 28, 28' are configured as force-controlled, hydraulically actuated valves which are activated by the control device 22 for closure and release. The parameters used for the closure and release times in this case are positionings of the delivery pistons of the thick-matter pumps 10, 10' recorded by means of sensors or switches. The closing or locking of the valve 28, 28' is forced in this case, while the opening of the valve takes place passively in response to the delivery pressure of the thick-matter pump 10, 10' following the release of the valve 28, 28' by the control device 22. The application of fluid to the containers 16, 16' is brought about using the control device 22 by activating the two-way valves 40, 40' which can be switched independently of one another. In FIG. 2, the times at which the valve 28, 28' is activated are marked at 42, 44 and 46. At time 42, the delivery stroke of the first delivery cylinder, for example, is concluded. The valve 28, 28' is hydraulically closed. At 44, the switch-over between the first and the second delivery cylinder takes place. The valve 28, 28' is relieved of pressure, i.e., the forced control system or closure is switched off. At time 46, the working stroke of the second delivery cylinder begins and the delivery pressure produced thereby pushes the valve 28, 28' open, so that the batch of transported material is pumped into the delivery line 14, 14'.

The following can be said in summary: this disclosure relates to a device and a method for damping pressure fluctuations in a delivery line 14 of a two-piston thick-matter pump 10, having at least one container 16 connected to the delivery line 14 and at least partially filled with a compressible fluid, for the pulsing intake and delivery of transported material 12 in the working cycle of the thick-matter pump 10 with alternating compression and expansion of the fluid. According to this disclosure, in order to realize cost-effective, reliable damping, a control device 22 for the fluid filling level in the container 16 depending on operating parameters during the pumping operation is proposed, which control device has at least one pressure sensor 20 arranged in the container 16 or the delivery line 14 for determining the delivery pressure and also an electronic computing unit which is intended and suitable for determining and storing a pressure ratio V between delivery pressure values during a working cycle of the thick-matter pump 10, on the one hand, and a switch-over phase between each of the working cycles of the two pistons of the thick-matter pump, on the other hand, or a mean value M of the delivery pressure over a time interval during the switch-over phase as a measure of the effectiveness of the damping.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A device for damping pressure fluctuations in a delivery line of a thick-matter piston pump, comprising:
   a container which communicates with the delivery line and is at least partially filled with a compressible fluid, the container adapted for a pulsing intake and output of transported material during the pumping operation of the thick-matter pump with alternating compression and expansion of the compressible fluid; and
   a controller, comprising:
      a pressure sensor for determining delivery pressure; and
      an electronic computing unit configured for determining and storing:
         (a) a pressure ratio V between delivery pressure values occurring (i) during a working cycle of the thick-matter pump and (ii) during a switch-over phase between each working cycle of the pistons of the thick-matter pump, or
         (b) a mean value M of the delivery pressure over a time interval during the switch-over phase;
      wherein the controller is configured to operate a filling device to adjust the amount of the compressible fluid in the container in response to the pressure ratio V or the mean value M.

2. The device as claimed in claim 1, wherein the delivery pressure value occurring during the working cycle used for determining the pressure ratio V is a value measured towards the end of the delivery stroke.

3. The device as claimed in claim 1, further comprising the filling device for filling the container with compressible fluid in response to the controller.

4. The device as claimed in claim 3, wherein a lower threshold value and an upper threshold value of the delivery pressure are stored in the controller for starting and switching off the filling device.

5. The device as claimed in claim 3, wherein the filling device comprises an air compressor or a pressure cylinder.

6. The device as claimed in claim 1, further comprising a non-return valve disposed between the thick-matter pump and the container, the non-return valve being closed in the direction of the thick-matter pump.

7. The device as claimed in claim 6, wherein the non-return valve comprises a forced-control valve which can be closed and released via the controller.

8. The device as claimed in claim 7, wherein switching times for the closure and/or release of the non-return valve are variably selectable.

9. The device as claimed in claim 1, wherein the container comprises a pressure container.

10. The device as claimed in claim 1, wherein the container comprises a plurality of containers.

11. The device as claimed in claim 1, wherein the delivery line comprises a plurality of delivery lines, the piston thick-matter pump comprises a plurality of piston thick-matter pumps, and the container comprises a plurality of containers, each one of the delivery lines having at least one of the containers connected thereto.

12. The device as claimed in claim 1, further comprising a pressure container disposed as a buffer store for the compressible fluid between the filling device and the container.

13. The device as claimed in claim 1, wherein a cross section of the delivery line differs by no more than 25% from a cross section of the container and the cross section of the container is greater than the cross section of the delivery line.

14. A method for damping pressure fluctuations in a delivery line of a thick-matter piston pump, comprising:
  connecting a container to the delivery line and at least partially filling the container with a compressible fluid, the container being adapted for the pulsing intake and output of transported material during the working cycle of the thick-matter pump with alternating compression and expansion of the compressible fluid;
  using an electronic computing unit of a controller to determine and store:
    (a) a pressure ratio V between delivery pressure values occurring (i) during a working cycle of the thick-matter pump and (ii) during a switch-over phase between each working cycle of the pistons of the thick-matter pump, or
    (b) a mean value M of the delivery pressure over a time interval during the switch-over phase;
  and
  using the controller to adjust the amount of the compressible fluid in the container in response to the pressure ratio V or the mean value M.

15. The method as claimed in claim 14, further comprising continuously determining a delivery pressure using a pressure sensor arranged in the container or the delivery line.

16. The method as claimed in claim 14, wherein to determine the pressure ratio V a value measured towards the end of the delivery stroke is used as the delivery pressure value occurring during the working cycle.

17. The method as claimed in claim 14, further comprising adding fluid to the container with a filling device in response to the controller.

18. The method as claimed in claim 17, further comprising switching on the filling device when a pre-set lower threshold value of the fluid filling level in the container is reached and switching off the filling device when a pre-set upper threshold value of the fluid filling level is reached.

19. The method as claimed in claim 14, wherein air is used as the compressible fluid for the damping of pressure fluctuations.

20. The method as claimed in claim 14, wherein:
  the delivery line comprises a plurality of delivery lines, the piston thick-matter pump comprises a plurality of piston thick-matter pumps, and the container comprises a plurality of containers, each one of the delivery lines having at least one of the containers connected thereto.

* * * * *